US011974319B2

(12) United States Patent
Ye

(10) Patent No.: US 11,974,319 B2
(45) Date of Patent: Apr. 30, 2024

(54) PERFORMING LISTEN-BEFORE-TALK PROCEDURES ON BANDWIDTH PARTS

(71) Applicant: Google LLC, Mountain View, CA (US)

(72) Inventor: Shiang-Rung Ye, New Taipei (TW)

(73) Assignee: Google LLC, Mountain View, CA (US)

( * ) Notice: Subject to any disclaimer, the term of this patent is extended or adjusted under 35 U.S.C. 154(b) by 502 days.

(21) Appl. No.: 17/272,627

(22) PCT Filed: Sep. 5, 2019

(86) PCT No.: PCT/US2019/049693
§ 371 (c)(1),
(2) Date: Mar. 1, 2021

(87) PCT Pub. No.: WO2020/060764
PCT Pub. Date: Mar. 26, 2020

(65) Prior Publication Data
US 2021/0352723 A1    Nov. 11, 2021

Related U.S. Application Data

(60) Provisional application No. 62/733,891, filed on Sep. 20, 2018.

(51) Int. Cl.
*H04W 74/08* (2009.01)
*H04W 72/0453* (2023.01)
(Continued)

(52) U.S. Cl.
CPC ... *H04W 74/0816* (2013.01); *H04W 72/0453* (2013.01); *H04W 74/006* (2013.01); *H04W 74/008* (2013.01)

(58) Field of Classification Search
CPC ......... H04W 74/0816; H04W 72/0453; H04W 74/006; H04W 74/008; H04W 74/0808
See application file for complete search history.

(56) References Cited

U.S. PATENT DOCUMENTS

2016/0021661 A1   1/2016   Yerramalli et al.
2017/0280475 A1   9/2017   Yerramalli et al.
(Continued)

FOREIGN PATENT DOCUMENTS

CN    107079494 A    8/2017
CN    108432281 A    8/2018
(Continued)

OTHER PUBLICATIONS

"Foreign Office Action", EP Application No. 19773588.9, dated Mar. 18, 2021, 8 pages.

(Continued)

*Primary Examiner* — Abdullahi Ahmed
(74) *Attorney, Agent, or Firm* — Colby Nipper PLLC

(57) ABSTRACT

This document describes techniques and apparatuses for performing listen-before-talk procedures on bandwidth parts. These techniques include a user equipment (UE) initiating a first listen-before-talk (LBT) procedure on an active bandwidth part used in a radio resource control (RRC) connection between a UE and a base station. During the first LBT procedure, the UE receives a configuration message from the base station instructing the UE to change the active bandwidth part from the first bandwidth part to a second bandwidth part. Responsively, the UE changes the active bandwidth part and initiates a second LBT procedure on the second bandwidth part.

20 Claims, 5 Drawing Sheets

(51) Int. Cl.
*H04W 74/00* (2009.01)
*H04W 74/0816* (2024.01)

(56) References Cited

U.S. PATENT DOCUMENTS

| | | | |
|---|---|---|---|
| 2018/0124687 A1 | 5/2018 | Park et al. | |
| 2018/0220455 A1 | 8/2018 | Baghel et al. | |
| 2018/0234965 A1 | 8/2018 | Ahn et al. | |
| 2018/0270699 A1 | 9/2018 | Babaei et al. | |
| 2019/0110307 A1* | 4/2019 | Kim | H04W 74/0808 |
| 2019/0141695 A1 | 5/2019 | Babaei et al. | |
| 2019/0274162 A1* | 9/2019 | Zhang | H04W 72/0453 |
| 2019/0320467 A1* | 10/2019 | Freda | H04L 5/0055 |
| 2020/0053777 A1* | 2/2020 | Babaei | H04W 72/04 |
| 2020/0275484 A1* | 8/2020 | Xu | H04W 74/0808 |
| 2020/0275485 A1* | 8/2020 | Babaei | H04W 74/0808 |
| 2022/0191927 A1* | 6/2022 | Hedayat | H04W 24/08 |

FOREIGN PATENT DOCUMENTS

| | | |
|---|---|---|
| CN | 108513734 A | 9/2018 |
| CN | 112789935 A | 5/2021 |
| EP | 3726919 | 10/2020 |
| KR | 20170091051 A | 8/2017 |
| WO | 2020060764 | 3/2020 |

OTHER PUBLICATIONS

"International Preliminary Report on Patentability", Application No. PCT/US2019/049693, dated Mar. 23, 2021, 9 pages.

"Foreign Office Action", EP Application No. 19773588.9, dated Apr. 4, 2022, 8 pages.

"Channel Access Procedure for NR Unlicensed Operation", 3GPP TSG RAN WG1 Meeting #94, Gothenburg, Sweden, Aug. 20-24, 2018, Aug. 2018, 5 pages.

"Discussion on Physical UL Channel Design in NR Unlicensed Spectrum", 3GPP TSG RAN WG1 Meeting #94, Gothenburg, Sweden, Aug. 20-24, 2018, Aug. 2018, 3 pages.

"Discussion on the Channel Access Procedures", 3GPP TSG RAN WG1 Meeting #94, Gothenburg, Sweden, Aug. 20-24, 2018, Aug. 2018, 6 pages.

"International Search Report and Written Opinion", PCT Application No. PCT/US2019/049693, dated Nov. 19, 2019, 15 pages.

"On Wideband Operation for NR-U", 3GPP TSG RAN WG1 Meeting #94, Gothenburg, Sweden, Aug. 20-24, 2018, Aug. 2018, 7 pages.

Lagen, et al., "New Radio beam-based Access to Unlicensed Spectrum: Design Challenges and Solutions", submitted to IEEE Commun. Surveys & Tutorials, Sep. 27, 2018, 18 pages.

"Foreign Office Action", IN Application No. 202147006263, dated Jan. 13, 2022, 7 pages.

"Channel access procedure for NR unlicensed operation", 3GPP TSG RAN WG1 Meeting #94—R1-1808507, Aug. 2018, 5 pages.

"Discussion on BWP operation for NR-U", 3GPP TSG-RAN2 Meeting #102—R2-1808468, May 2018, 3 pages.

"Discussion on physical UL channel design in NR unlicensed spectrum", 3GPP TSG RAN WG1 Meeting #94—R1-1808236, Aug. 2018, 3 pages.

"Foreign Office Action", CN Application No. 201980054065.5, Feb. 1, 2024, 30 pages.

"Foreign Office Action", EP Application No. 19773588.9, Feb. 7, 2024, 8 pages.

"Summary of remaining issues on bandwidth part and wideband operation", 3GPP TSG RAN WG1 Meeting #92—R1-1801347, Mar. 2018, 13 pages.

\* cited by examiner

US 11,974,319 B2

PERFORMING LISTEN-BEFORE-TALK PROCEDURES ON BANDWIDTH PARTS

RELATED APPLICATION(S)

This application is a national stage entry of International Application No. PCT/US2019/049693, filed Sep. 5, 2019, which claims the benefit of U.S. Provisional Application No. 62/733,891, filed Sep. 20, 2018, the disclosures which are incorporated herein by reference in their entirety.

BACKGROUND

Generally, a provider of a wireless network manages wireless communications over the wireless network. For example, a base station manages a wireless connection with a user equipment (UE) that is connected to the wireless network. The base station determines configurations for the wireless connection, such as bandwidth, timing, and protocol for the wireless connection. Fifth Generation New Radio (5G NR), for example, utilizes certain transmission rules, such as Clear Channel Assessment (CCA) and Listen-Before-Talk (LBT), to allow different systems, such as Wi-Fi™ and Long-Term Evolution (LTE) systems, to share an unlicensed frequency band with a contention-oriented access while maintaining the performance of each individual system.

With bandwidth adaptation, receive and transmit bandwidths of a UE need not be as large as the bandwidth of a cell (e.g., base station). Further, the bandwidth of the UE can be adjusted. For example, a width of the bandwidth can be ordered to change (e.g., to shrink during a period of low activity to save power), a location of the UE's bandwidth can move in the frequency domain (e.g., to increase scheduling flexibility), or subcarrier spacing can be ordered to change (e.g., to allow different services). A subset of the total cell bandwidth of a cell is referred to as a Bandwidth Part (BWP). Bandwidth adaptation is achieved by configuring the UE with BWP(s) and communicating to the UE which of the configured BWPs is currently the active BWP.

Current wireless communication systems allow a UE to be configured with more than one BWP for a cell. Typically, however, only one BWP is active at a time. The active BWP may change at any time, including during an LBT procedure on the active BWP. This, of course, may result in inefficiencies as the LBT procedure is performed based on a channel status of the active BWP when the LBT procedure is initiated.

SUMMARY

This document describes techniques and apparatuses for performing listen-before-talk procedures on bandwidth parts. These techniques include a user equipment (UE) initiating a first listen-before-talk (LBT) procedure on an active bandwidth part used in a radio resource control (RRC) connection between the UE and a base station. The first LBT procedure may be initiated when the UE has information to transmit to the base station. During the first LBT procedure, the UE receives a configuration message from the base station instructing the UE to change the active bandwidth part from a first bandwidth part to a second bandwidth part. Responsively, the UE changes the active bandwidth part and then initiates a second LBT procedure on the second bandwidth part.

Aspects described below include a method performed by a user equipment for performing listen-before-talk procedures on bandwidth parts. The method includes the user equipment initiating a first listen-before-talk procedure on an active bandwidth part used in a radio resource control connection between the user equipment and a base station. The first listen-before-talk procedure is initiated when the user equipment has information to transmit to the base station. During the first listen-before-talk procedure, the method includes receiving a configuration message from the base station directing the user equipment to change the active bandwidth part from a first bandwidth part to a second bandwidth part. The method also includes changing the active bandwidth part from the first bandwidth part to the second bandwidth part based on the configuration message. In response to changing the active bandwidth part from the first bandwidth part to the second bandwidth part, the method additionally includes initiating a second listen-before-talk procedure on the second bandwidth part.

Aspects described below also include a user equipment comprising a radio-frequency transceiver. The user equipment also includes a processor and memory system configured to perform any of the methods described.

Aspects described below also include a system with means for performing listen-before-talk procedures on bandwidth parts.

BRIEF DESCRIPTION OF THE DRAWINGS

The details of one or more aspects of performing listen-before-talk procedures on bandwidth parts are described below. The use of the same reference numbers in different instances in the description and the figures indicate similar elements.

DETAILED DESCRIPTION

Conventional wireless communication systems configured for multiple bandwidth parts (BWP) may be inefficient when changing an active BWP from a first BWP to a second BWP. Generally, listen-before-talk (LBT) procedures initiated on a BWP are performed based on a channel status of a particular BWP (e.g., the active BWP). If the active BWP is changed from a first BWP to a second BWP during an ongoing LBT procedure on the first BWP, it may not be reasonable to continue that LBT procedure on the second BWP because the LBT procedure is performed based on the channel status of the first BWP.

This document describes techniques and systems for performing LBT procedures on BWPs. For example, when an active BWP is changed, the LBT procedure is reset. An LBT procedure that was in process at the time of the BWP change can be aborted and a new LBT procedure initiated on the new active BWP. If the UE includes multiple active BWPs on a cell, then each active BWP can be associated with a different LBT procedure.

By resetting the LBT procedure when the active BWP is changed, the new LBT procedure can be performed more efficiently and perhaps more quickly than continuing the previous LBT procedure on the new BWP. This may be due to the contention window of the new active BWP being smaller than the contention window of the previous active BWP. In an example, the current active BWP may be overloaded or crowded and, thus, may have a large contention window, which could cause a long delay in the LBT procedure. A second BWP may have less traffic and therefore a smaller contention window, allowing the LBT procedure to potentially finish more quickly. Continuing the current LBT procedure after the BWP is switched to the second BWP, however, may not decrease the contention window of the current LBT procedure and therefore may not reduce the delay. Resetting the LBT procedure for the new active BWP may reduce the delay based on a new contention window.

Operating Environment

Figure 1:
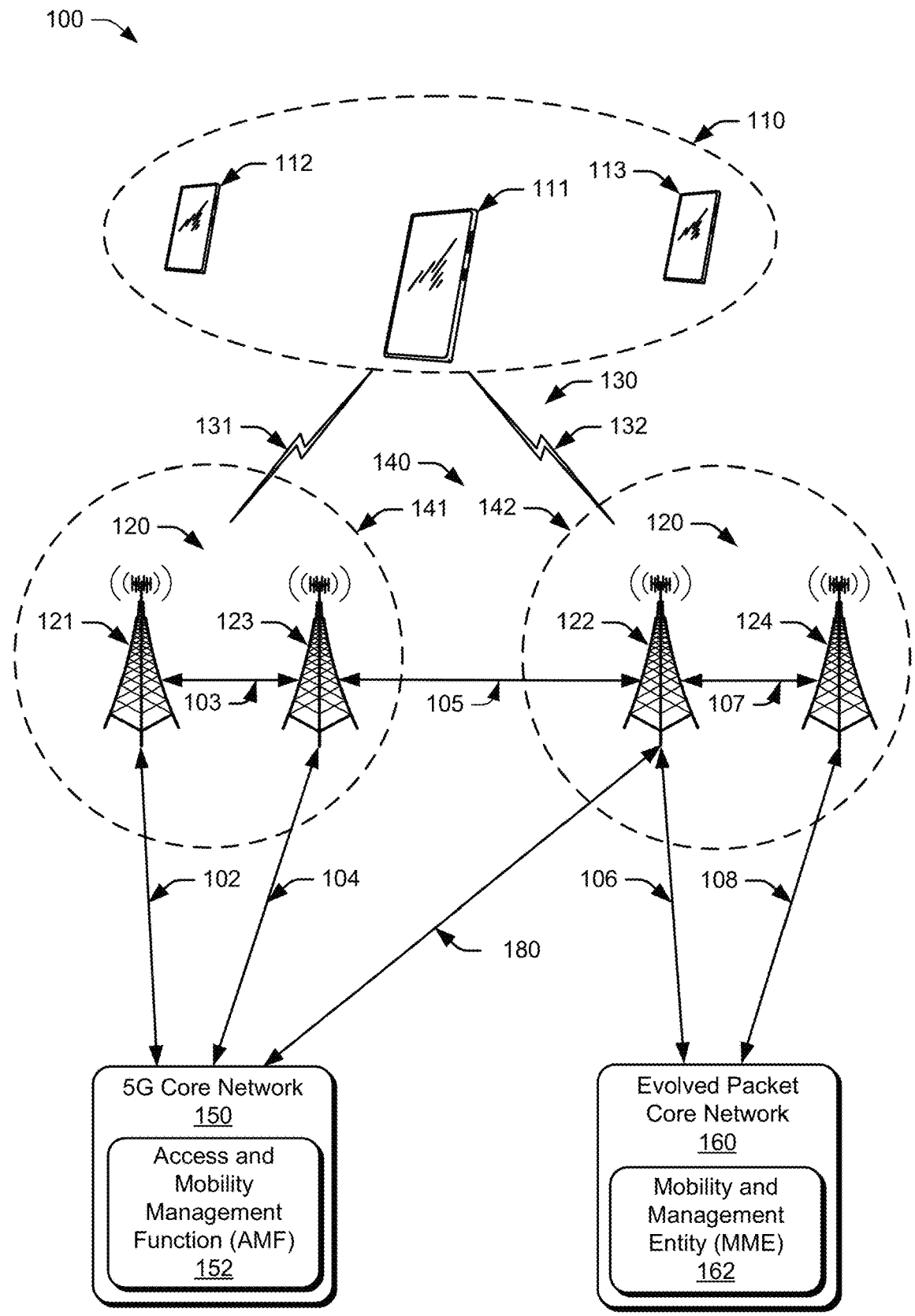
FIG. 1 illustrates an example operating environment in which aspects of performing listen-before-talk procedures on bandwidth parts can be implemented.

FIG. 1 illustrates an example environment 100, which includes multiple user equipment 110 (UE 110), illustrated as UE 111, UE 112, and UE 113. Each UE 110 communicates with base stations 120 (illustrated as base stations 121, 122, 123, and 124) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110. Additionally, multiple wireless links 130 may be configured for single-RAT dual connectivity or multi-RAT dual connectivity (MR-DC). Each of these various multiple-link situations tends to increase the power consumption of the UE 110.

The base stations 120 are collectively a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an Si interface for control-plane signaling and user-plane data communications. Optionally or additionally, if the base station 122 connects to the 5GC 150 and EPC 160 networks, the base station 122 connects to the 5GC 150 using the NG2 interface for control-plane signaling and through the NG3 interface for user-plane data communications, at 180.

In addition to connections to core networks, the base stations 120 may communicate with each other. For example, the base stations 121 and 123 communicate through an Xn interface at 103, the base stations 122 and 123 communicate through an Xn interface at 105, and the base stations 122 and 124 communicate through an X2 interface at 107.

The 5GC 150 includes an Access and Mobility Management Function 152 (AMF 152), which provides control-plane functions such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

Example Devices

Figure 2:
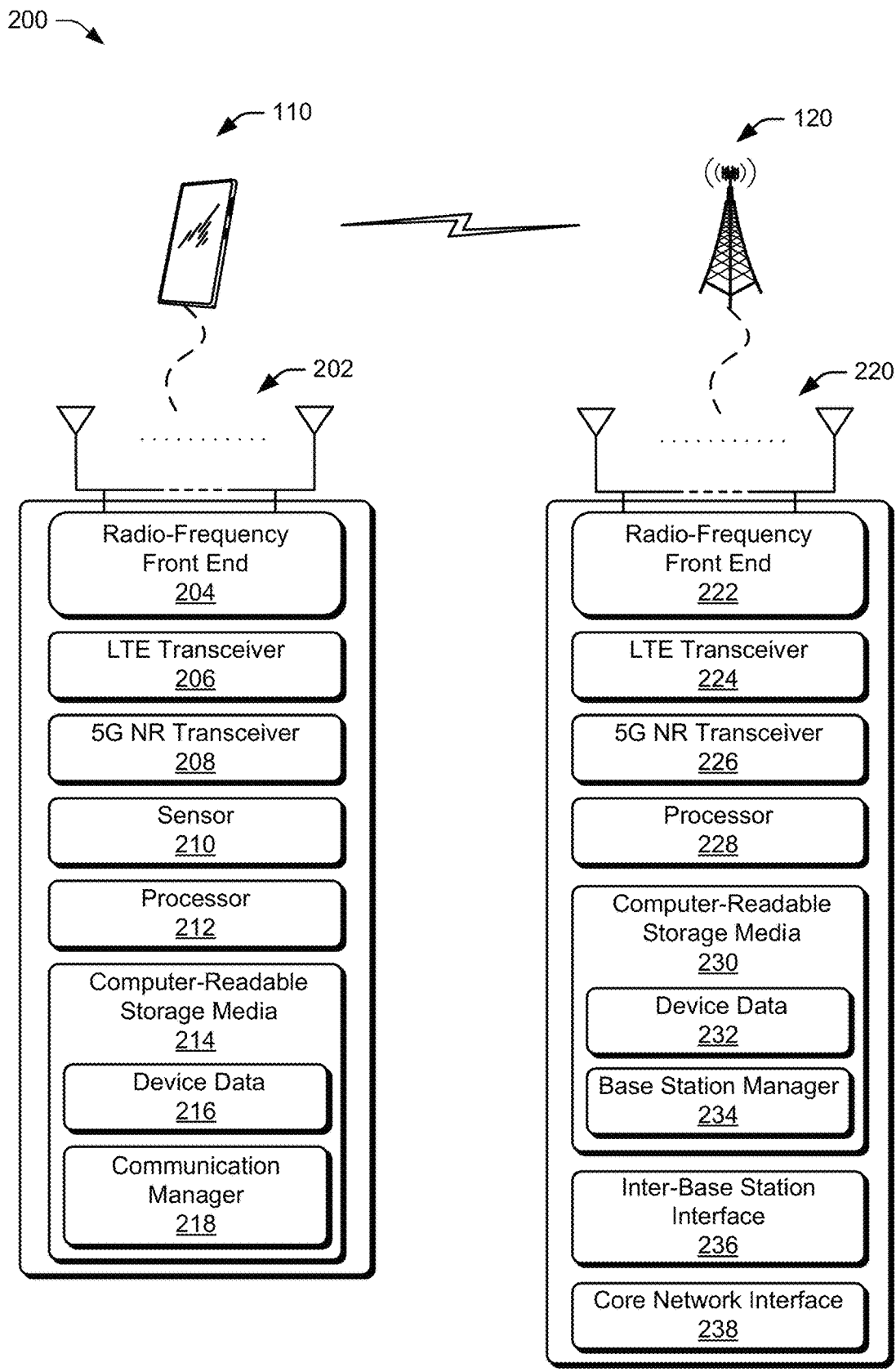
FIG. 2 illustrates an example device diagram of a user equipment and a serving cell base station.

FIG. 2 illustrates an example device diagram 200 for devices that can implement various aspects of performing LBT procedures on bandwidth parts. Included in FIG. 2 is an example UE 110 and an example base station 120, which may each include additional functions and interfaces that are omitted from FIG. 2 for the sake of clarity. The UE 110 includes antennas 202, a radio-frequency front end 204 (RF front end 204), and radio-frequency transceivers (e.g., an LTE transceiver 206 and a 5G NR transceiver 208) for communicating with the base station 120 in the 5G RAN 141 and/or the E-UTRAN 142. The RF front end 204 of the UE 110 can couple or connect the LTE transceiver 206, and the 5G NR transceiver 208 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base station 120. By way of example and not limitation, the antennas 202 and the RF front end 204 can be implemented for operation in subgigahertz bands, sub-6 GHz bands, and/or above 6 GHz bands that are defined by the 3GPP LTE and 5G NR communication standards.

The UE 110 includes one or more sensors 210 to detect various properties such as temperature, supplied power, power usage, battery state, or the like. As such, the sensor 210 may include any one or a combination of temperature sensors, thermistors, battery sensors, and power usage sensors.

The UE 110 also includes at least one processor 212 and computer-readable storage media 214 (CRM 214). The processor 212 may be a single core processor or a multiple core processor composed of a variety of materials, such as silicon, polysilicon, high-K dielectric, copper, and so on. The computer-readable storage media described herein excludes propagating signals. CRM 214 may include any suitable memory or storage device such as random-access memory (RAM), static RAM (SRAM), dynamic RAM (DRAM), non-volatile RAM (NVRAM), read-only memory (ROM), or Flash memory usable to store device data 216 of the UE 110. The device data 216 includes user data, multimedia data, beamforming codebooks, applications, and/or an operating system of the UE 110, which are executable by the processor 212 to enable user-plane communication, control-plane signaling, and user interaction with the UE 110.

CRM 214 also includes a communication manager 218. Alternately or additionally, the communication manager 218 may be implemented in whole or part as hardware logic or circuitry integrated with or separate from other components of the UE 110. In at least some aspects, the communication manager 218 configures the RF front end 204, the LTE transceiver 206, and/or the 5G NR transceiver 208 to implement the techniques for performing LBT procedures on BWPs described herein.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The base station 120 includes antennas 220, a radio-frequency front end 222 (RF front end 222), one or more LTE transceivers 224, and/or one or more 5G NR transceivers 226 for communicating with the UE 110. The RF front end 222 of the base station 120 can couple or connect the LTE transceiver 224 and the 5G NR transceiver 226 to the antennas 220 to facilitate various types of wireless communication. The antennas 220 of the base station 120 may include an array of multiple antennas that are configured similar to or differently from each other. The antennas 220 and the RF front end 222 can be tuned to, and/or be tunable to, one or more frequency band defined by the 3GPP LTE and 5G NR communication standards, and implemented by the LTE transceivers 224, and/or the 5G NR transceivers 226. Additionally, the antennas 220, the RF front end 222, the LTE transceivers 224, and/or the 5G NR transceivers 226 may be configured to support beamforming, such as Massive-MIMO, for the transmission and reception of communications with the UE 110.

The base station 120 also includes at least one processor 228 and computer-readable storage media 230 (CRM 230). The processor 228 may be a single core processor or a multiple core processor composed of a variety of materials, such as silicon, polysilicon, high-K dielectric, copper, and so on. CRM 230 may include any suitable memory or storage device such as random-access memory (RAM), static RAM (SRAM), dynamic RAM (DRAM), non-volatile RAM (NVRAM), read-only memory (ROM), or Flash memory usable to store device data 232 of the base station 120. The device data 232 includes network scheduling data, radio resource management data, beamforming codebooks, applications, and/or an operating system of the base station 120, which are executable by the processor 228 to enable communication with the UE 110.

CRM 230 also includes a base station manager 234. Alternately or additionally, the base station manager 234 may be implemented in whole or part as hardware logic or circuitry integrated with or separate from other components of the base station 120. In at least some aspects, the base station manager 234 configures the LTE transceivers 224 and the 5G NR transceivers 226 for communication with the UE 110, as well as communication with a core network. The base station 120 includes an inter-base station interface 236, such as an Xn and/or X2 interface, which the base station manager 234 configures to exchange user-plane and control-plane data between another base station 120, to manage the communication of the base station 120 with the UE 110. The base station 120 includes a core network interface 238 that the base station manager 234 configures to exchange user-plane and control-plane data with core network functions and entities.

Listen-Before-Talk Procedures on Bandwidth Parts

BWP switching for a Serving Cell is used to activate an inactive BWP and deactivate an active BWP at a certain time. The BWP switching is generally controlled by a timer (e.g., bwp-InactivityTimer), RRC signaling, a physical downlink control channel (PDCCH) indicating a downlink assignment or an uplink grant, or a media access control (MAC) entity of the UE 110 upon initiation of a Random Access procedure. Upon addition of a special cell (SpCell) or activation of a secondary cell (SCell), the downlink BWP and uplink BWP may be active without receiving the PDCCH indicating the downlink assignment or the uplink grant. The active BWP for the Serving Cell is indicated by either RRC or PDCCH. For an unpaired spectrum, the downlink BWP is paired with the uplink BWP, and BWP switching is common for both uplink (UL) and downlink (DL).

Figure 3:
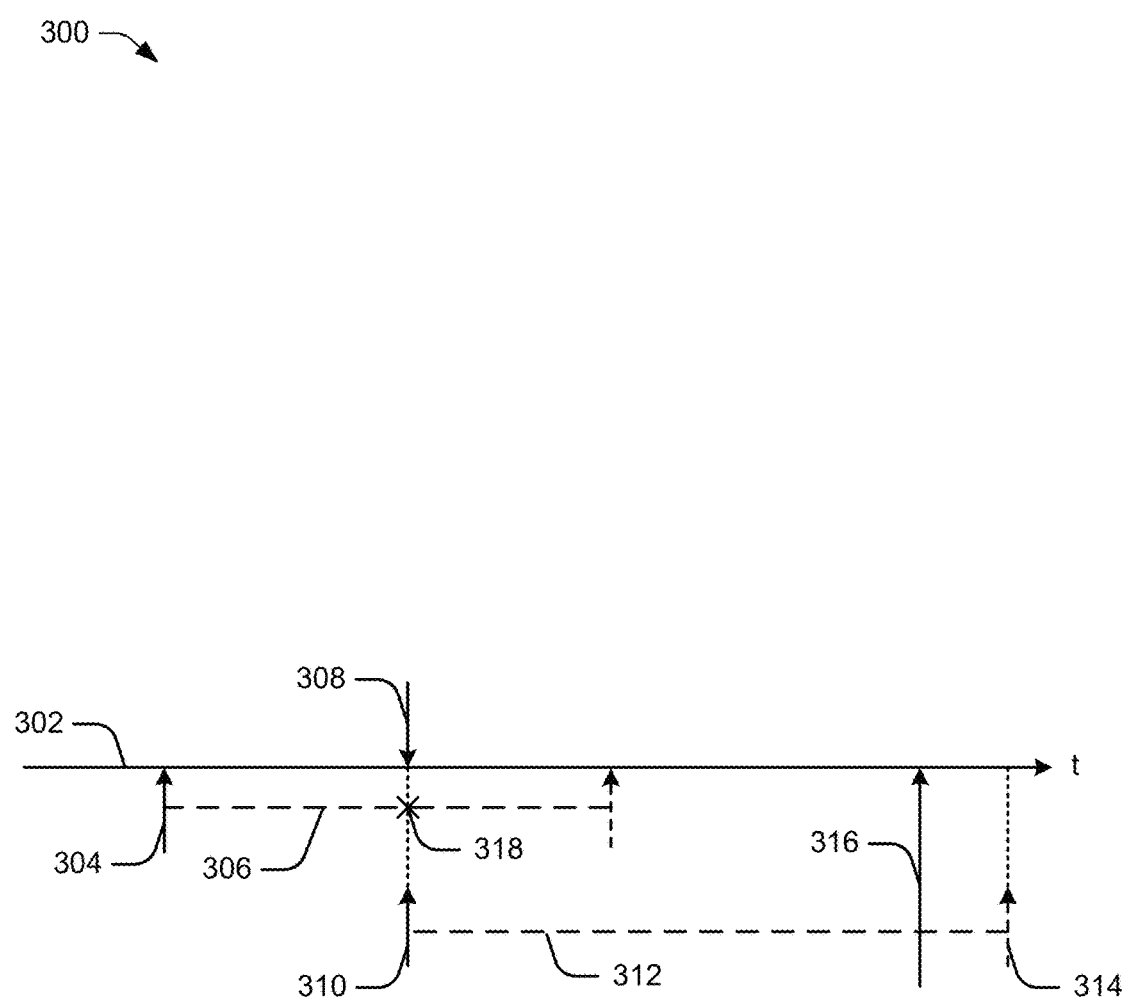
FIG. 3 illustrates an example implementation of a performing listen-before-talk procedures on bandwidth parts.

FIG. 3 illustrates an example implementation 300 of using listen-before-talk procedures on BWPs. The illustrated example includes a timeline 302 during which the UE 110 maintains an RRC connection with the base station 120 and a first BWP is designated as the active BWP. At some point on the timeline 302, the UE 110 obtains information (e.g., control data or user data) and initiates a first LBT procedure 304 on the first BWP to determine whether a channel associated with the first BWP is available for transmitting the information. The first LBT procedure 304 includes activation of a first timer 306, which defines a duration of time for the UE 110 to complete the first LBT procedure. Typically, the UE 110 continues the first LBT procedure 304 until the first timer 306 expires or the information transmits in accordance with the LBT protocol. If the first timer 306 expires, the UE 110 may terminate and restart the first LBT procedure 304 on the first BWP.

If, during the first LBT procedure 304, the base station sends a command to the UE 110 to change the active BWP to a different BWP, then it may not be reasonable to continue the first LBT procedure 304 on the different BWP. This is because the first LBT procedure 304 is performed based on the channel status of the first BWP. For example, the contention window in the first LBT procedure 304 is set according to the channel status of the first BWP. In contrast to conventional techniques that simply continue the first LBT procedure 304 on the second BWP, the techniques described herein allow the UE 110 to reset the LBT procedure. In aspects, the UE 110 initiates a new LBT procedure for the second BWP. The new LBT procedure may include setting one or more parameters according to the channel status of the second BWP, which is now the active BWP.

In FIG. 3, the UE 110 receives a new configuration message commanding the UE 110 to change the active BWP from the first BWP to the second BWP at 308. The UE 110 complies with the command and switches the active BWP to the second BWP. In response to this switch, the UE 110 also initiates a second LBT procedure 310 based on a channel status of the second BWP. Initiation of the second LBT procedure 310 may include setting a second timer 312 to define a duration of time in which to complete the second LBT procedure 310. The UE 110 continues the second LBT procedure 310 until the second timer 312 expires (e.g., at 314) or until the information transmits 316 in accordance with the LBT protocol. If the second LBT procedure 310 is successful, the UE 110 transmits uplink information (control data or user data) on the second BWP at 316. In addition, the UE 110 can stop the second timer 312 because the uplink information was transmitted.

In some aspects, the UE 110 aborts the first LBT procedure 304 at 318 and stops the first timer 306 when initiating the second LBT procedure 310. Alternatively, the UE 110 aborts the first LBT procedure 304 at 318 when initiating the second LBT procedure 310 and allow the first timer 306 to continue until expiration of the defined duration of time. This may be beneficial in case the base station 120 commands the UE 110 to change the active BWP back to the first BWP prior to expiration of the first timer 306. In such a case, the UE 110 may avoid aborting the first LBT procedure 304 when switching the active BWP to the second BWP and then restarting the first LBT procedure 310 on the first BWP when switching the active BWP back to the first BWP. Rather, the UE 110 can simply continue executing the first LBT procedure 310 that was previously running.

The base station 120 can also configure different default values for LBT parameters (e.g., a maximum contention window, a minimum contention window, a timer) that are used to define the LBT procedure. Prior to initiating an LBT procedure, the UE 110 sets corresponding LBT parameters to one or more default values associated with the corresponding BWP. Each LBT procedure can have different default values in comparison to the other LBT procedures.

The base station 120 can also configure different LBT parameters for a same channel access priority. When the UE 110 initiates the first LBT procedure 304 or the second LBT procedure 310, the UE 110 sets LBT parameters to specific values associated with the first BWP or the second BWP, respectively, in accordance with a priority level. The base station 120 can define different parameters for different channel access priorities and provide those parameters to the UE 110. Different BWPs can have a same priority, and therefore the LBT parameters can be used to associate an LBT procedure with a particular BWP.

In some aspects, the UE 110 may have multiple active BWPs in a cell, which can be handled independently and/or in parallel. If the UE 110 has more than one active BWP, each active BWP can be associated with a different LBT procedure. In an example, a first uplink BWP is associated with a first LBT procedure 304 and the second uplink BWP is associated with a second LBT procedure 310. The first LBT procedure 304 and the second LBT procedure 310 use their own unique counter, timer, and parameters. If the base station 120 schedules transmission on both the first BWP and the second BWP at the same time, the first LBT procedure 304 and the second LBT procedure 310 are performed in parallel.

In at least one example, the uplink information (e.g., control data or user data) includes a scheduling request (SR). The UE 110 can use a scheduling request procedure to transmit a SR to indicate to the base station 120 that the UE 110 has data (control data or user data) to transmit to the base station 120. For example, when high priority data arrives, the UE 110's MAC entity triggers a scheduling request. The UE 110 can transmit the scheduling request to the base station 120 using pre-configured radio resources (e.g., time-frequency resources previously allocated to the UE 110 for uplink transmissions). Because the base station 120 is not aware that the UE 110 will be transmitting the SR, the base station 120 may send the UE 110 a BWP-switching command during the ongoing LBT procedure.

If the active BWP is changed from the first BWP to the second BWP, the UE 110 can abort the ongoing SR procedure on the first BWP. Generally, the SR procedure continues until data transmission is successful or an associated timer expires. However, because the active BWP is switched, this ongoing SR procedure is aborted. Then, the UE 110 can initiate a second SR procedure on the second BWP.

In some implementations, the uplink information can include a MAC protocol data unit (PDU) that is transmitted with an uplink grant pre-configured by the base station 120. The base station 120 can provide the UE 110 with a type-1 or type-2 configured grant configuration so the UE 110 may not be required to request and receive a grant (notification of when and where to transmit data) on the PDCCH from the base station 120. The type-1 configured grant is provided by RRC messages and stored as a configured uplink grant. The type-2 configured grant is provided by PDCCH and stored or cleared as a configured uplink grant based on an indication of configured-grant activation or deactivation. If the base station 120 allocates the type-1 configured grant to the UE 110, then the UE 110 can, upon completion of the configuration, use the configured grant to transmit uplink data. For the type-2 configured grant, after the configuration is completed, the base station 120 sends the UE 110 downlink control information (DCI) on the PDCCH addressed to a configured scheduling radio network temporary identifier (CS-RNTI) of the UE 110. Then, the UE 110 can use the DCI as the configured grant to transmit uplink data.

In at least one example, the base station 120 indicates BWP switching using a particular field in the DCI. For example, the field can include a BWP identifier (ID) of the BWP to which the UE 110 should switch.

The UE 110 may change the active BWP to an initial BWP or a default BWP upon expiration of a timer, such as a bwp-InactivityTimer. For example, if the first BWP is used as a default active BWP and the UE 110 changes the active BWP to the second BWP based on a switching command from the base station 120, and subsequently the bwp-InactivityTimer associated with the second BWP expires without successfully completing the LBT procedure, then the UE 110 can autonomously switch the active BWP back to the default BWP (e.g., the first BWP). The UE 110 can make this switch based on the bwp-InactivityTimer and without explicit instructions from the base station 120.

In an example, the base station 120 transmits a configuration message corresponding to a third BWP to the UE 110 using one or more RRC messages. The configuration message indicates whether the third BWP is an active BWP. The indication can be implemented by a field in the configuration message. This may allow the UE 110 to use multiple active BWPs. Prior to transmitting information on the third BWP, however, the UE 110 performs an LBT procedure on the third BWP.

In some aspects, the base station 120 may provide the UE 110 an uplink grant by transmitting a downlink control information (DCI) on a PDCCH to the UE 110. In the DCI, the base station can activate another BWP by including a BWP ID of the BWP in a field of the DCI. When the UE 110 receives the field, the UE 110 activates the BWP without deactivating a current active BWP where the DCI is received.

Alternatively, the base station 120 may provide the UE 110 a MAC control element that includes a BWP identifier (ID). The MAC control element can indicate that the BWP with the BWP-ID is an active BWP. The BWP-ID can identify a particular BWP based on a parameter of the BWP, such as a DCI code.

Example Methods

Example methods 400 and 500 are described with reference to FIGS. 4 and 5, respectively, in accordance with one or more aspects of performing LBT procedures on BWPs. Methods 400 and 500 are shown as a set of operations (or acts) performed but not necessarily limited to the order or combinations in which the operations are illustrated. Further, any of one or more of the operations may be repeated, combined, reorganized, skipped, or linked to provide a wide array of additional and/or alternate methods. In portions of the following discussion, reference may be made to environment 100 of FIG. 1 and entities detailed in FIG. 2, reference to which is made for example only. The techniques are not limited to performance by one entity or multiple entities operating on one device.

Figure 4:
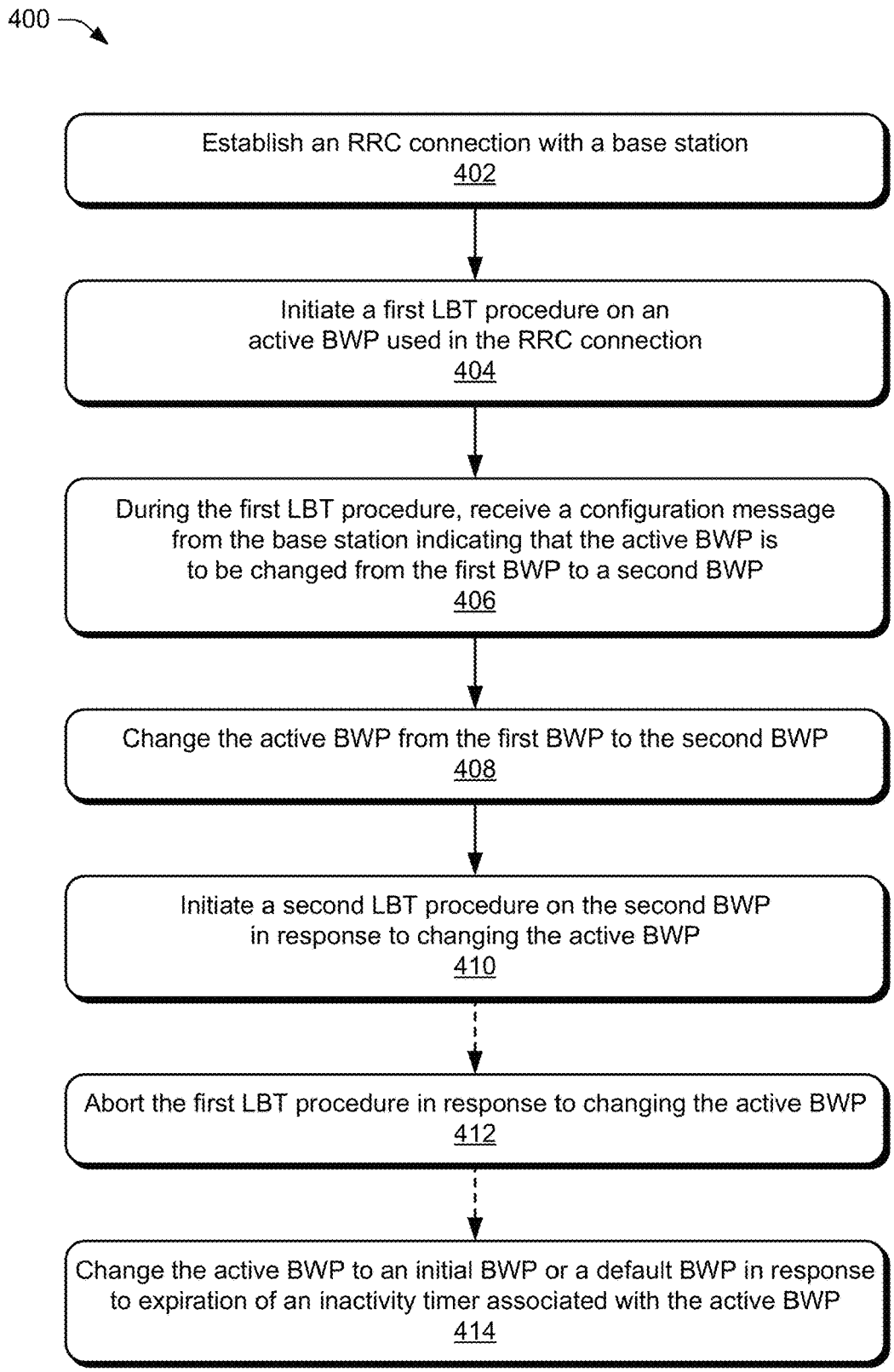
FIG. 4 depicts an example method 400 for managing communications between a user equipment to a base station in accordance with aspects of the techniques described herein.

FIG. 4 depicts an example method 400 for managing communications between a UE 110 and a base station 120 in accordance with aspects of the techniques described herein. At 402, a UE establishes a radio resource control (RRC) connection with a base station. For example, the UE 110 establishes the RRC connection with the base station 120. The RRC connection can be established in any suitable way, such as using a random access procedure on a BWP. When the random access procedure is successfully completed and the RRC connection is established, the BWP becomes the active BWP. Subsequently, the base station 120 can further assign the UE 110 with additional BWPs using RRC messages.

At 404, the UE initiates a first LBT procedure on the active BWP used in the RRC connection with the base station. For example, the UE 110 initiates a first LBT procedure 304 on the active BWP used in the RRC connection with the base station 120, as shown in FIG. 3. In some aspects, the UE 110 initiates the first LBT procedure 304 when the UE 110 has information, such as control data or user data, to transmit to the base station 120. The UE 110 may also initiate a timer 306 corresponding to the first LBT procedure 304. In some aspects, the UE 110 sets an LBT counter associated with the first LBT procedure 304 to a default value assigned by the base station 120. Additionally or alternatively, the UE 110 sets parameters of the first LBT procedure 304 to values associated with the first BWP.

At 406, the UE receives a configuration message from the base station directing the UE to change the active BWP from the first BWP to a second BWP. For example, the UE 110 receives a configuration message from the base station 120 directing the UE 110 to change the active BWP from the first BWP to a second BWP, as shown at 308 in FIG. 3. In one example, the UE 110 can detect a downlink control information (DCI) on a PDCCH from the base station 120 and the DCI can include the BWP-switching instruction.

At 408, the UE changes the active BWP from the first BWP to the second BWP based on the configuration message. For example, the UE 110 changes the active BWP from the first BWP to the second BWP based on the configuration message.

At 410, the UE initiates a second LBT procedure on the second BWP in response to changing the active BWP from the first BWP to the second BWP. For example, the UE 110 initiates a second LBT procedure 310 on the second BWP in response to changing the active BWP from the first BWP to the second BWP. In at least some aspects, the UE 110 sets an LBT counter associated with the second LBT procedure 310 to a default value assigned by the base station 120 that may be different than the default value of the LBT counter for the first LBT procedure. Additionally or alternatively, the UE 110 sets parameters of the second LBT procedure 310 to values associated with the second BWP that may be different than the parameter values of the first LBT procedure. If the first LBT procedure 304 was initiated for a first scheduling request (SR) procedure, then the UE 110 can initiate a second SR procedure on the second BWP.

Optionally at 412, the UE aborts the first LBT procedure in response to changing the active BWP. For example, the UE 110 aborts the first LBT procedure 304 in response to changing the active BWP. Alternatively, the UE 110 can abort the first LBT procedure 304 in response to an expiration of the corresponding timer 306. The UE 110 may also stop or suspend the timer 306 for the first LBT procedure 304 in response to changing the active BWP.

Optionally at 414, the UE changes the active BWP to an initial BWP or a default BWP in response to expiration of an inactivity timer associated with the active BWP. For example, the UE 110 changes the active BWP to an initial BWP or a default BWP in response to expiration of an inactivity timer associated with the active BWP. In an example, the UE 110 switches the active BWP back to the first BWP (or a different BWP designated as a default BWP) if an inactivity timer associated with the second BWP expires prior to successful completion of the second LBT procedure 310.

Figure 5:
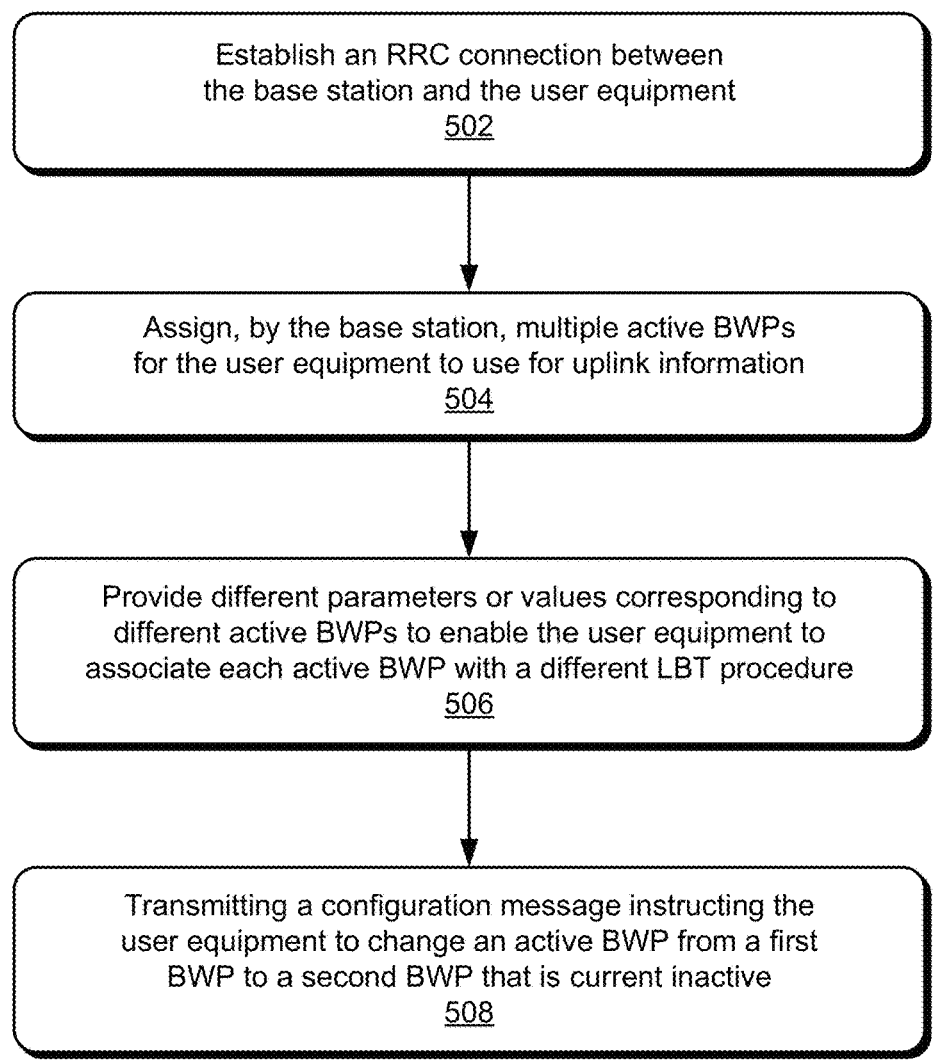
FIG. 5 depicts an example method 500 for managing communications between a user equipment to a base station in accordance with aspects of the techniques described herein.

FIG. 5 depicts an example method 500 for managing communications between the UE 110 and the base station 120 in accordance with aspects of the techniques described herein. At 502, the base station establishes an RRC connection between the base station and the UE. For example, the base station 120 establishes an RRC connection between the base station 120 and the UE 110. The RRC connection can be established in any suitable way, examples of which are described above.

At 504, the base station assigns multiple active BWPs for the UE to use for uplink information. For example, the base station 120 assigns multiple active BWPs for the UE 110 to use for uplink information. Generally, only one BWP is active per cell for the UE 110. However, it may be useful for multiple BWPs to be active to enhance uplink and downlink capabilities between the UE 110 and the base station 120.

At 506, the base station provides different parameters or values corresponding to different active BWPs to enable the UE to associate each active BWP with a different LBT procedure. For example, the base station 120 provides different parameters or values corresponding to different active BWPs to enable the UE 110 to associate each active BWP with a different LBT procedure. The parameters or values can correspond to a counter, a timer, a contention window size, and so on. In addition, the parameters or values can be used as default values for defining the LBT procedures.

At 508 the base station transmits a configuration message to the UE instructing the UE to change an active BWP from a first BWP to a second BWP that is currently inactive. For example, the base station 120 transmits a configuration message to the UE 110 instructing the UE 110 to change an active BWP from a first BWP to a second BWP that is currently inactive. The base station 120 may transmit this command if the first BWP is overloaded or crowded and, thus, has a large contention window, which could cause a long delay in the LBT procedure. In contrast, the second BWP may have less traffic and therefore a smaller contention window, allowing the LBT procedure to potentially finish more quickly.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

When an ordinal number (such as "first", "second", "third" and so on) is used as an adjective before "configuration message", "LBT procedure", "bandwidth part", "counter", "value", "parameters", "timer", or "scheduling request", that ordinal number is used to indicate a particular feature, such as to distinguish that particular feature from another feature that is described by the same term or by a similar term. For example, a "first widget" may be so named merely to distinguish it from, e.g., a "second widget."

Conclusion

Although techniques using, and apparatuses performing, listen-before-talk procedures on bandwidth parts have been described in language specific to features and/or methods, it is to be understood that the subject of the appended claims is not necessarily limited to the specific features or methods described. Rather, the specific features and methods are disclosed as example implementations of performing listen-before-talk procedures on bandwidth parts.

What is claimed is:

1. A method of a user equipment for performing listen-before-talk procedures on bandwidth parts, the method comprising the user equipment:
   initiating a first listen-before-talk procedure on an active bandwidth part used in a radio resource control connection between the user equipment and a base station, the first listen-before-talk procedure initiated when the user equipment has information to transmit to the base station;
   during the first listen-before-talk procedure, receiving a configuration message from the base station directing the user equipment to change the active bandwidth part from a first bandwidth part to a second bandwidth part;
   changing the active bandwidth part from the first bandwidth part to the second bandwidth part based on the configuration message; and
   responsive to changing the active bandwidth part from the first bandwidth part to the second bandwidth part:
      setting a listen-before-talk parameter to a value associated with a second listen-before-talk procedure; and
      initiating the second listen-before-talk procedure on the second bandwidth part.

2. The method of claim 1, further comprising:
   receiving one or more additional radio resource control messages from the base station indicating a configuration for a third bandwidth part, the one or more additional radio resource control messages instructing the user equipment to use the third bandwidth part as an additional active bandwidth part;
   performing a third listen-before-talk procedure on the third bandwidth part; and
   transmitting uplink information on the third bandwidth part in addition to transmitting other uplink information on the second bandwidth part.

3. The method of claim 1, further comprising:
   aborting the first listen-before-talk procedure in response to changing the active bandwidth part.

4. The method of claim 1, further comprising:
   initiating a timer for the first listen-before-talk procedure; and
   aborting the first listen-before-talk procedure responsive to expiration of the timer.

5. The method of claim 1, wherein:
   the information includes a scheduling request and the first listen-before-talk procedure corresponds to a first scheduling request procedure on the first bandwidth part,
   the method further comprising:
      responsive to changing the active bandwidth part:
         aborting the first scheduling request procedure; and
         initiating a second scheduling request procedure on the second bandwidth part.

6. The method of claim 1, further comprising:
   prior to initiating the first listen-before-talk procedure, setting a first listen-before-talk parameter associated with the first listen-before-talk procedure to a first default value assigned by the base station,
   wherein the setting of the listen-before-talk parameter to the value associated with the second listen-before-talk procedure comprises setting a second listen-before-talk parameter associated with the second listen-before-talk procedure to a second default value assigned by the base station, the second default value being different than the first default value.

7. The method of claim 6, wherein the first listen-before-talk parameter comprises a first listen-before-talk counter and the second listen-before-talk parameter comprises a second listen-before-talk counter.

8. The method of claim 6, wherein:
   the first listen-before-talk parameter comprises a first maximum contention window and the second listen-before-talk parameter comprises a second maximum contention window; or
   the first listen-before-talk parameter comprises a first minimum contention window and the second listen-before-talk parameter comprises a second minimum contention window.

9. The method of claim 6, wherein the first listen-before-talk parameter comprises a first timer and the second listen-before-talk parameter comprises a second timer.

10. The method of claim 1, further comprising:
setting a first listen-before-talk parameter of the first listen-before-talk procedure to a first value associated with the first bandwidth part,
wherein the setting of the listen-before-talk parameter to the value associated with the second listen-before-talk procedure comprises setting a second listen-before-talk parameter of the second listen-before-talk procedure to a value associated with the second bandwidth part.

11. The method of claim 1, wherein the second listen-before-talk procedure is initiated with a new contention window that is smaller than a contention window of the first listen-before-talk procedure.

12. The method of claim 10, wherein the second listen-before-talk parameter has a different value than the first listen-before-talk parameter.

13. The method of claim 1, wherein the initiating of the second listen-before-talk procedure comprises performing a new listen-before-talk procedure.

14. The method of claim 1, wherein the initiating of the second listen-before-talk procedure comprises resetting the first listen-before-talk procedure.

15. The method of claim 1, wherein, the first bandwidth part and the second bandwidth part are associated with a same channel access priority.

16. The method of claim 1, wherein the listen-before-talk parameter comprises at least one of:
a counter; or
a timer.

17. A user equipment comprising a processor and a radio-frequency transceiver, the user equipment configured to:
initiate, using the processor, a first listen-before-talk procedure on an active bandwidth part used in a radio resource control connection between the user equipment and a base station, the first listen-before-talk procedure initiated when the user equipment has information to transmit to the base station;
during the first listen-before-talk procedure, receive, using the radio-frequency transceiver, a configuration message from the base station directing the user equipment to change the active bandwidth part from a first bandwidth part to a second bandwidth part;
change, using the processor, the active bandwidth part from the first bandwidth part to the second bandwidth part based on the configuration message; and
responsive to changing the active bandwidth part from the first bandwidth part to the second bandwidth part:
set, using the processor, a listen-before-talk parameter to a value associated with a second listen-before-talk procedure; and
initiate, using the processor, a second listen-before-talk procedure on the second bandwidth part.

18. The user equipment of claim 17, wherein the user equipment is further configured to:
receive one or more additional radio resource control messages from the base station indicating a configuration for a third bandwidth part, the one or more additional radio resource control messages instructing the user equipment to use the third bandwidth part as an additional active bandwidth part;
perform a third listen-before-talk procedure on the third bandwidth part; and
transmit uplink information on the third bandwidth part in addition to transmitting other uplink information on the second bandwidth part.

19. A non-transitory computer-readable storage medium storing executable instructions, that, responsive to execution by a processor, are configured to:
initiate a first listen-before-talk procedure on an active bandwidth part used in a radio resource control connection between a user equipment and a base station, the first listen-before-talk procedure initiated when the user equipment has information to transmit to the base station;
during the first listen-before-talk procedure, process a configuration message from the base station directing the user equipment to change the active bandwidth part from a first bandwidth part to a second bandwidth part;
change the active bandwidth part from the first bandwidth part to the second bandwidth part based on the configuration message; and
responsive to changing the active bandwidth part from the first bandwidth part to the second bandwidth part:
set a listen-before-talk parameter to a value associated with a second listen-before-talk procedure; and
initiate a second listen-before-talk procedure on the second bandwidth part.

20. The non-transitory computer-readable storage medium of claim 19, wherein the second listen-before-talk procedure is initiated with a new contention window that is smaller than a contention window of the first listen-before-talk procedure.

* * * * *